April 16, 1957 M. W. PURSER 2,788,566
CIRCULAR CUTTER FOR GENERAL MACHINE WORK
Filed April 11, 1950 4 Sheets-Sheet 1
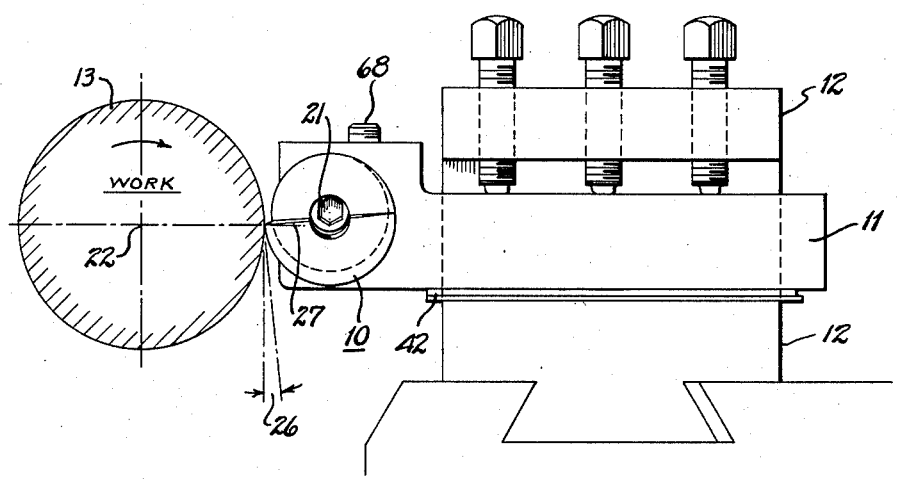
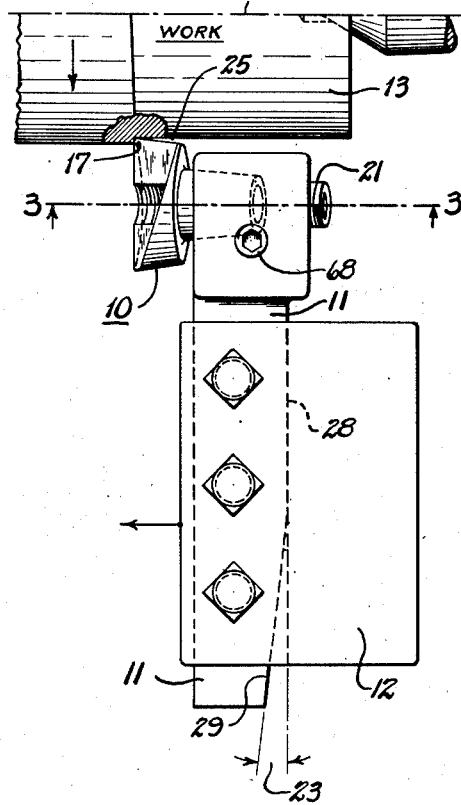
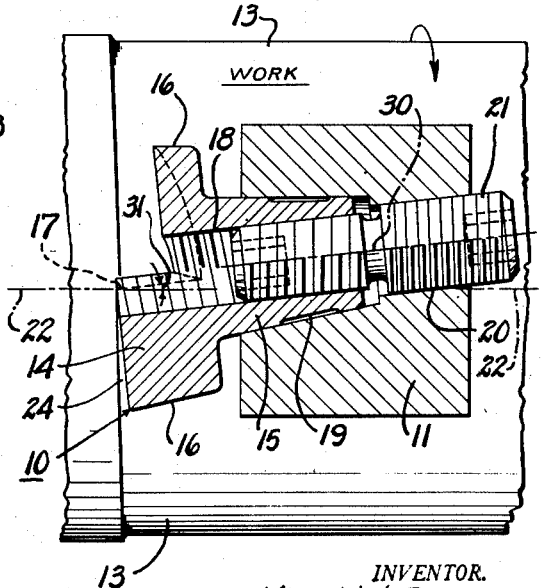
INVENTOR.
MARK W. PURSER
BY
Austin, Wilhelm & Carlson
ATTORNEYS.

April 16, 1957 M. W. PURSER 2,788,566
CIRCULAR CUTTER FOR GENERAL MACHINE WORK
Filed April 11, 1950 4 Sheets-Sheet 2
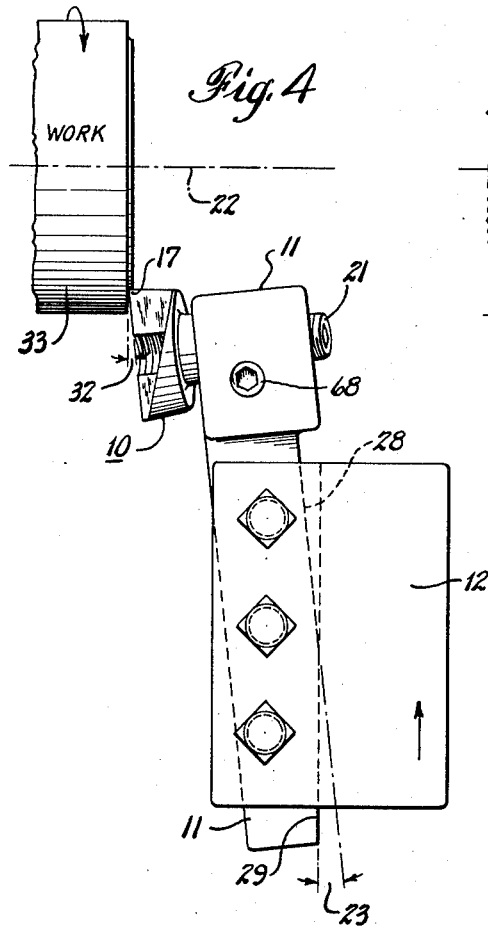
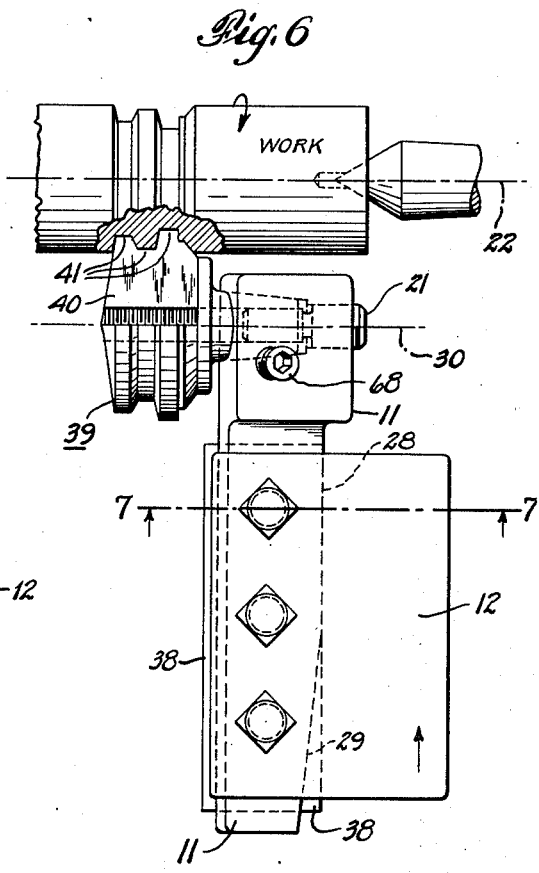
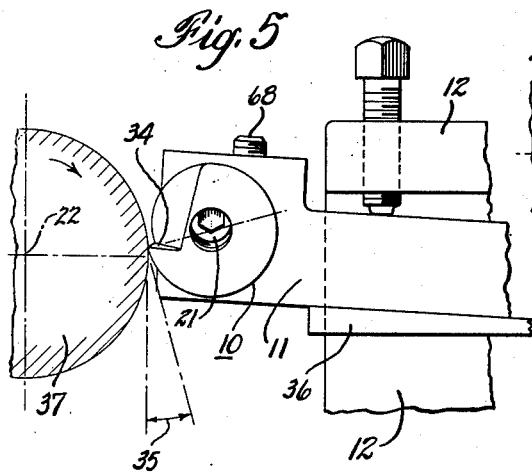
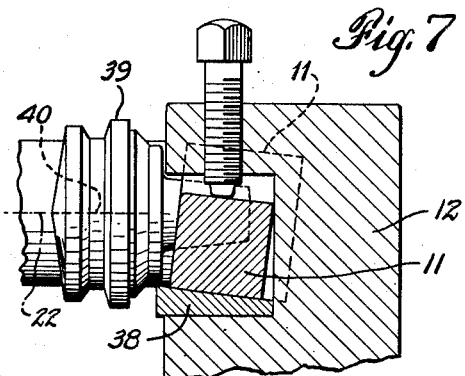
INVENTOR.
MARK W. PURSER
BY
Austin, Wilhelm + Carlson
ATTORNEYS.

April 16, 1957     M. W. PURSER     2,788,566
CIRCULAR CUTTER FOR GENERAL MACHINE WORK
Filed April 11, 1950     4 Sheets-Sheet 3
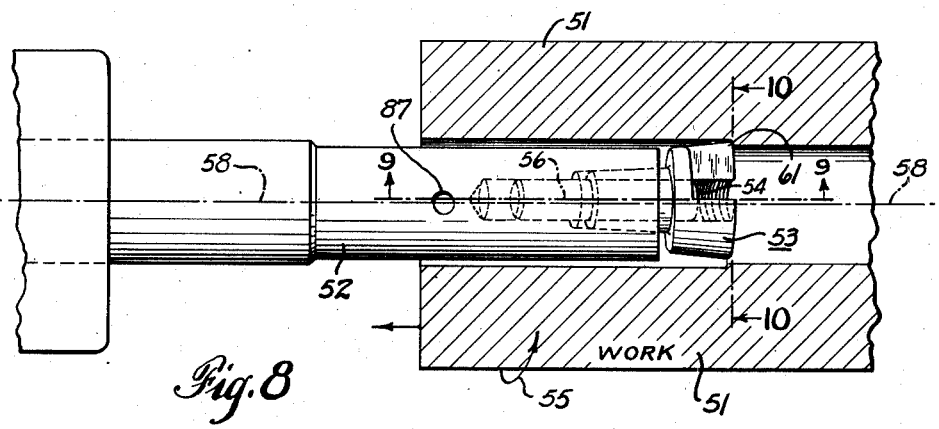
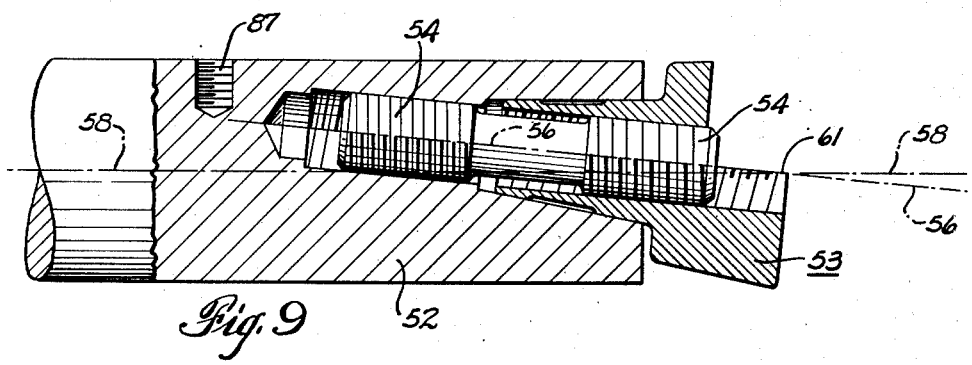
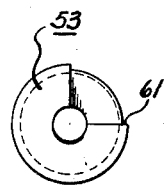
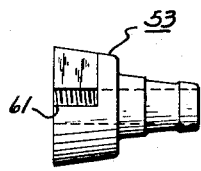
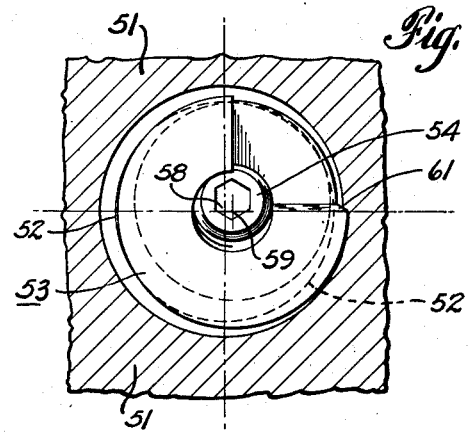
INVENTOR.
MARK W. PURSER
BY
Austin, Wilhelm & Carlson
ATTORNEYS.

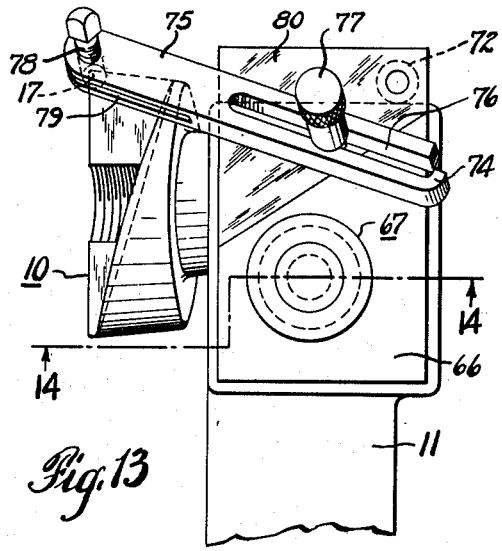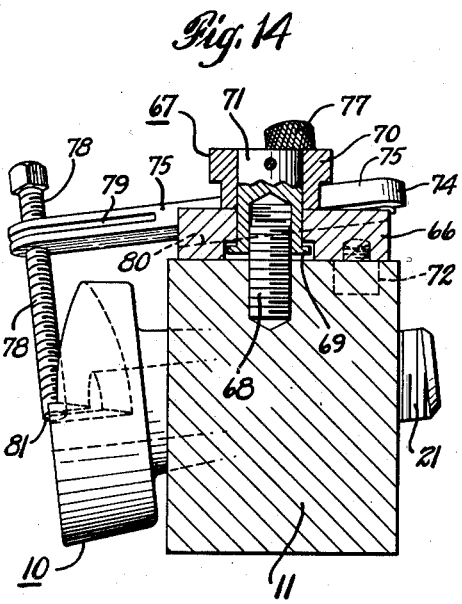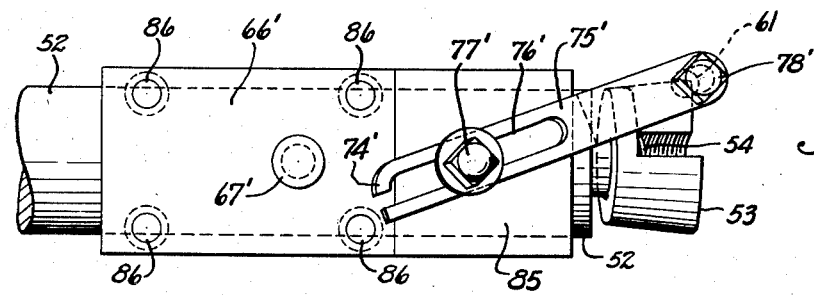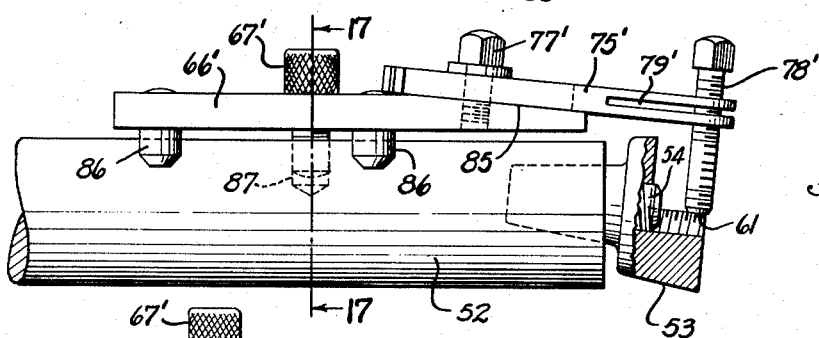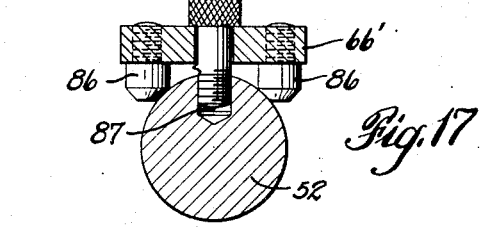
INVENTOR.
MARK W. PURSER

United States Patent Office 2,788,566
Patented Apr. 16, 1957

2,788,566
CIRCULAR CUTTER FOR GENERAL MACHINE WORK

Mark W. Purser, Rochester, N. Y.; Edwina Purser, executrix of said Mark W. Purser, deceased Application April 11, 1950, Serial No. 155,331

7 Claims. (Cl. 29—102)

The invention relates to improved cutting tools for use on machine tools such as lathes, boring mills, shapers, planers, etc., and to jigs or gauges for adjusting such cutters.

According to a preferred form of the invention, a circular cutter is provided which is shaped and mounted in such a way as to give proper clearance and relief angles. The cutter is provided with a tapered extension which is anchored into a correspondingly tapered recess by means of a differentially threaded stud. A special jig or gauge is provided so that, when the cutter is removed for sharpening, it may be replaced by another similar cutter whose cutting nose will be in exactly the same position with respect to the work as that of the cutter just removed. The cutter may be mounted in a shank or bar for external lathe work such as cylindrical, taper or profile turning cuts or for straight or bevel facing cuts; or the cutter may be mounted in a boring bar for internal work such as boring cuts or internal facing.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 is a side elevation, partly in section, of an outside cutting tool, according to the invention; this is as viewed in a direction of the lathe spindle axis looking toward the tailstock;

Fig. 2 is a plan view of Fig. 1;

Fig. 3 is a vertical section taken along the line 3—3 of Fig. 2 and illustrating the differentially threaded anchoring stud which anchors and locks the cutter positively into the tool shank;

Fig. 4 is a plan view similar to Fig. 2 except that it illustrates making a facing cut instead of a turning cut; it also illustrates how the tool shank may be clamped in the tool block with the bevel of the shank firmly located against a vertical surface of the tool block;

Fig. 5 is a figure corresponding to Fig. 1 showing the use of a tapered shim for inclining the axis of the shank to place the cutting point above the work axis;

Fig. 6 is a plan view of a cutting tool showing the invention applied to a form cutter;

Fig. 7 is a vertical section taken on the line 7—7 of Fig. 6 and illustrating how a shim having a transverse taper (as contrasted to a longitudinal taper shown in Fig. 5) is used to bring the axis of the cutting tool horizontal and parallel to the lathe axis;

Fig. 8 is a plan longitudinal section taken through the spindle center and illustrating the use of the invention as a boring tool;

Fig. 9 is a section taken on the line 9—9 of Fig. 8, illustrating how the differentially threaded stud holds the cutting tool in position in the boring bar;

Fig. 10 is a section taken on the line 10—10 of Fig. 8, illustrating the offset of the tool center relative to the center of the boring bar;

Fig. 11 is an end view of the cutter shown in Figs. 8 to 10;

Fig. 12 is a side elevation of the cutter of Figs. 8 to 11;

Fig. 13 is a top plan view of the new jig or gauge, according to the invention; this is shown in place on top of a tool shank for the outside cutting tool and illustrates how the position of the cutting nose is set to the same position as that of the previous cutter;

Fig. 14 is a vertical section taken on the line 14—14 of Fig. 13;

Fig. 15 is a top plan view of the jig or gauge shown in position on top of the boring bar;

Fig. 16 is a side elevation of Fig. 15; and

Fig. 17 is a transverse section on the line 17—17 of Fig. 16.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring to the drawings, and more particularly to Figs. 1 to 3, a setup is illustrated showing the use of the circular cutter for doing external work on a conventional lathe. Here, the cutter, indicated by 10, is mounted on a shank or bar 11 which in turn is secured in a tool block 12. If desired, shims 42 may be interposed between the bottom of shank 11 and the block. The tool block has a recess whose lower face is horizontal, against which the shank 11 and shims 42 are clamped by screws as is well known to those skilled in the art. The cutter is shown contacting a workpiece, indicated by 13, revolving about the center line 22 of the lathe.

The circular cutter 10 comprises a head 14 and a tapered extension 15. The head 14 has a conical surface 16 symmetrical with the axis 30 of the cutter. Part of the head 14 is cut or ground away to form a cutting lip with nose 17 and cutting edge to machine the work.

The cutter in Figs. 1 to 3 is shown with half the metal ground away by sharpening. It will be understood that a new cutter will have a substantially complete head 14 and that the cut-away segment will be only of sufficient angle to form the cutting nose 17 on the remaining stock segment and to provide room for the escape of chips. As the tool dulls in use, the tool is removed from the machine and sharpened, cutting more of the remaining stock segment away and increasing the size of the open segment. Compare, for example, the cutter shown in Fig. 11, which has a sector of approximately 90° cut away with the cutter shown in Fig. 1 which has a sector of approximately 180° cut away.

The cutter 10 is secured to the shank 11 in the following manner. The cutter has a threaded hole 18 and the extension 15 has one or more circumferential clearance grooves 19. The tool shank 11 has a conical socket for the cutter extension, and a threaded hole 20. The threads in the holes are preferably left hand; the thread of cutter hole 18 is of greater lead than the thread of hole 20 to obtain a differential effect.

A stud 21 with a thread at each end of substantial difference in lead, herein referred to as a differentially threaded stud, is screwed into the two holes 18 and 20 to clamp and lock the circular cutter positively into the tool shank 11. The stud 21 has a hexagonal recess in each end so that it may be tightened by a hexagonal, Allen wrench from either end. The stud 21 is preferably enough larger at the shank end so that it can be screwed into the threaded hole in the shank 11 from either end of the hole.

Any tendency for the cutter 10 or stud 21 to slip or rotate in the shank, due to torque load applied by the cutting operation, would only tend to lock the cutter all the tigher in the shank between the stud and the tapered hole. The relief groove or grooves 19 on the cutter extension 15 help to make a better mating fit between the cutter and the shank and allows room for slight metal flow, in the event of any slight difference between the taper angles of the cutter extension and the shank recess. If desired, the annular relief grooves 19 might be placed equally well on the conical socket of the shank 11.

If desired, the conical surface on the extension of the circular cutter and of the bore of the support may be omitted and plane cylindrical surfaces with shoulders placed on these mating parts.

The angular relationships between the cutter, the lathe parts and the work is important. In Figs. 1 to 3, the axis 30 of the cutter lies in a vertical plane parallel to the work axis 22 and slopes downwardly to the left, as indicated in Figs. 2 and 3, with respect to the top and bottom surfaces of the shank 11 which are assumed to be horizontal. To obtain this relationship, the tool may be clamped in the tool block with the vertical surface 28 of the shank located firmly against a vertical surface of the tool block, this latter vertical surface being usually perpendicular to the axis of the lathe spindle. This is the usual position of the tool for a turning cut.

The taper of conical surface 16 on the cutter head gives a cutting clearance angle 25 (Fig. 2) between the nose 17 of the cutter and the turned cylindrical surface of the workpiece 13. The slope of the cutter axis 30 also provides a side relief angle 24 (Fig. 3). The cutter is shown with the cutting nose 17 cutting "on center," i. e. in a horizontal plane passing through the lathe axis. The point where the cutter center-line intersects a vertical plane passing through the cutter nose 17 and normal to the lathe axis is "above center" (i. e. above the lathe center line) to provide the relief angle 26 in Fig. 1. The cutter may be sharpened to give any desired back rake or side rake angle; a negative back rake angle 27 is shown in Fig. 1 and a negative side rake angle 31 is shown in Fig. 3.

Referring now to Fig. 4, the cutter is illustrated making a facing cut, as indicated by the nose 17 engaging the plane end of the work 33. The shank 11 is provided with an inclined or oblique vertical surface 29 located against the vertical end face in the slot in the tool block 12 at an angle 23 to reference surface 28. Angle 23 is equal to the clearance angle 32 illustrated in Fig. 4.

To change from an outside cylindrical cut to a facing cut, the shank 11 of Figs. 1 to 3 is slightly turned to locate oblique vertical surface 29 against vertical surface of tool block as shown in Fig. 4. This automatically gives the side cutting clearance angle 32 with the end face of the workpiece.

Shims may be provided between the shank 11 and the bottom of the tool block 12 for obtaining different relationships between the several angles and the work for different cutting conditions and materials. In Fig. 5, for example, a tapered shim 36 is shown which slopes the shank 11 upwardly toward the work while retaining the side surface 28 in a vertical plane. A positve back rake angle 34 and relief angle 35 are indicated here; as with Figs. 1 to 3, other rake angles may be used. A rocker support and parallel shim could be used in the tool post instead of shim 36 to have the same effect.

Referring to Figs. 6 and 7, a transverse-tapered shim 38 may be provided which changes the slope of the cutter axis 30 without changing the general slope of the shank 11 toward the work. In these figures, the shim 38 places the cutter axis 30 parallel to the lathe axis 22. Here the head 39 of the cutter is a forming tool, the head being ground away to provide cutting lip 40 and cutting edges 41. Other profiles or shapes may be used on the forming tool, instead of the shape illustrated in Fig. 6, as for example, a cutter in the form of a circular thread chaser for the purpose of cutting screw threads.

In addition to the simple wedges—36 in Fig. 5 and 38 in Fig. 7, sloping in a single direction—compound wedges (not shown) may be provided which slope in two mutually perpendicular directions. The shim thickness and the two angles of taper may be designed to suit any machine or requirements. Varying these two angles and the shim thickness effectively varies the following relations of the cutter with respect to the workpiece, side rake, back rake, side relief, front relief, elevation of cutter nose with respect to center line of work. If desired, these shims may be eliminated and the required shim angles and shim height may be built into the design of the shank.

The invention may also be applied to a boring tool, as illustrated in Figs. 8 to 12. In the form shown, the work 51 is intended to rotate in the direction of the arrow 55 without the tool rotating. It will be understood that the tool may rotate without the work rotating, if desired. The boring tool may be used for cutting an inside cylindrical surface as shown, or a taper or profile cut, or it may also be used for bottoming or facing.

The cutter 53 is of substantially the same shape and style as the cutter shown in Figs. 1 to 3. The cutter 53 is held in the boring bar 52 by stud 54 in a manner similar to corresponding parts in Figs. 1 to 3, except that in Figs. 8 to 12 the threads are right handed, instead of left handed, so as to cause any tendency of slippage to automatically lock the cutter positively between stud and tapered hole in the boring bar.

The center line 56 of the cutter is shown for convenience as lying in a vertical plane and sloping downwardly toward the cutting end of the boring bar. For convenience, the boring bar 52 is shown concentric with the hole, although in practice this condition will vary with the machining operation. In Fig. 10, 59 indicates the center of the large end of the cutter; 58 indicates the center of the boring bar and of the bore in the work.

It will be understood that the cutter 53 in Figs. 8 to 12 may have the usual relief, and clearance angles, and rake angles, commonly used when doing this type of work.

Referring now to Figs. 13 and 14, a jig or gauge is illustrated for adjusting the proper position of a new or re-sharpened outside cutter, such as shown in Figs. 1 to 4. The jig comprises a base plate 66 journaling a nut member 67 which may be screwed onto a stud 68 fixed very firmly on the plane top surface of the cutter end of shank 11. The nut member 67 comprises a body 71 with a flange 69 working in a recess in the plate 66, and a knurled thumb piece 70 pinned to the body 71 of the nut member. It will be understood that the details of construction of the nut member 67 may be varied.

Thus by turning the knurled thumb piece 70, the nut member 67 may be screwed to engage the jig with the top of the shank 11 or to disengage it. A locating screw 72, threaded into the plate 66, insures the proper relationship between the jig and the front face of the shank 11.

The plate 66 of the jig has a tapered surface 80 sloping in two mutually perpendicular directions; on surface 80 is positioned an arm 75. A screw 77 passes through a slot 76 in the arm into the plate 66 for releasably clamping the arm 75 onto the plate 66. The slot 76 has an offset end 74 to prevent the arm 75 from completely sliding out from under screw 77 and thus inadvertently becoming disassembled from the plate.

The arm 75 extends out beyond the plate 66, as shown. An adjusting screw 78 is threaded into a hole tapped perpendicularly through the arm 75. A relatively narrow slot 79 is sawed in the end of the arm in a direction normal to the axis of the adjusting screw 78. This slot is sawed, after the hole for the adjusting screw 78 has been threaded with a tap. Before screwing the adjusting screw 78 into the tapped hole, the arm is sprung slightly beyond its elastic limit by squeezing the small slot narrower than it was sawed, or by wedging it open wider than when it was sawed. Then when the adjusting screw 78 is screwed into the tapped hole, the two portions of the arm on either side of the narrow slot become strained in such manner that sufficient friction is maintained between the adjusting screw and arm as to hold the adjusting screw in whatever position it is adjusted.

The arm 75 is so positioned relative to the base plate 66, and the adjusting screw 78 is so positioned relative to the arm, that the lower end 81 of the adjusting screw will contact the sizing portion of the cutting edge of the cutter to locate the cutter 10 in the shank, in correct position for machining.

The upper oblique surface 80 of the base plate is inclined to the lower surface. This places the lower end face 81 of the adjusting screw in a plane parallel to this oblique surface. The angle of this oblique surface, and the manner of mounting the jig on the shank 11, is such that the lower face 81 of the adjusting screw is disposed in a plane which passes through the axis 30 of the circular cutter and the cutting point 17, at the position of the cutting point at which the setting is usually made. Actually, since the position of the cutting point 17 may vary, as the circular cutter is adjusted in its support for different setups, the plane common to the cutter axis 30 and the cutting point 17 may depart from the plane of the lower face 81 of the adjusting screw.

By such arrangement, the sizing portion of the cutter nose will always be correctly located by the lower face 81 of the set screw even if the cutter lip is ground with appreciable negative rake and the jig may always be used without causing any binding of the cutter against the adjusting screw when the cutter is tightened into position by the stud 21. The lower face 81 of the adjusting screw 78 is hardened to about 63 Rockwell C. so that it will not be appreciably marred by the nose of the cutter.

To use the jig shown in Figs. 13 to 14, it is only necessary to secure it to the top of the shank 11 when positioning a cutter 10 in the shank 11 for a new job. The knurled nut 67 of the jig is screwed down onto stud 68 to engage the plate 66 firmly against the plane top surface of the cutter end of the shank, with the positioning stud 72 against the front face of the shank. The clamping screw 77 is loosened to free arm 75. The adjusting screw 78 is brought into line with the cutter nose 17 and clamping screw 77 tightened. The adjusting screw 78 is then screwed down to engage its lower surface 81 with cutter nose 17.

The jig is then removed from the shank and laid aside. The adjustment of clamping screw 77, or of adjusting screw 78 is left unchanged for the duration of the job for which it is desired to maintain the same adjustment for the cutter after each sharpening regrind or for a plurality of successive similar cutters.

To install a fresh cutter 10, after the old cutter is worn, it is only necessary to remove the dull cutter from the shank; then replace it with the new cutter. The new cutter will first be approximately positioned in the shank and held loosely thus by the stud 21 without tightening the stud 21. The jig is then replaced on the shank and the new cutter is rotated to place its nose up against the end surface 81 of the adjusting screw 78. The stud 21 is then tightened, and the jig is then removed from the shank.

Thus, each time a fresh cutter is used, the cutter can always be replaced in the shank with its cutting nose in the same position with respect to the work.

Referring now to Figs. 15, 16 and 17, the form of jig suitable for use with the boring tool of Figs. 8 to 12 will now be described.

It is obvious that the main parts of the jig correspond with the main parts of the jig of Figs. 13 and 14 used with the outside tool of Figs. 1 to 3; and the same reference characters will be used, but with primes added, to identify the similar parts. No further discussion of these similar parts seems to be necessary.

The differences will now be described. The plate 66', instead of having a compound tapered upper surface, may for most purposes have a simple tapered surface 85. Furthermore, the plate is provided with four screws 86 whose heads have conical locating surfaces adapted to bear upon the cylindrical surface of the boring bar 52 when the main screw 67' is threaded into a hole 87 in the top of the boring bar. The use of this jig will be apparent from the description of the use of the outside jig.

Thus, a cutting apparatus has been described which has many advantages. It is extremely simple and economical to manufacture. It is easy to re-sharpen a cutter and adjust it in position, because neither cutter nor shank (or other support) requires any teeth or serrations in order to locate and lock the cutter relative to the shank in a rigid and positive manner.

A dull cutter can be quickly replaced with a sharp cutter so that production can be resumed immediately to machine the exact dimensions required on the workpiece thus eliminating the great time-loss otherwise necessary in machine re-setting such as readjusting the position of the tool shank or the machine stops.

The invention is particularly applicable to a machine tool using either one single cutting tool or a plurality of cutting tools for successive or simultaneous multiple machining cuts.

A cutter can be re-sharpened quickly by re-grinding the rake surface. A cutter can be quickly and accurately re-sharpened by grinding free hand without using any grinding jig. A large number of cutters can be re-sharpened simultaneously if a multiple grinding jig is used. A wide variety of different types of cutters may be used on the same shank. A wide range of different clearance angles and positive or negative back rake or side rake angles may be used on the cutters.

Further, the cutter is so shaped and positioned that clearance and relief angles are automatically obtained without requiring any grinding of these angles; it is only necessary to grind the rake angles.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a machining or cutting tool, a support having a tapered hole and a threaded hole in line therewith, a circular cutter having a head and a tapered extension in axial alignment and a cutting nose on the head to one side of the axis so that as the cutting nose engages a work piece there is a torque applied to the cutter about the axis, said tapered extension being adapted to seat in said tapered hole, said cutter having an axially aligned threaded hole, the threads in the hole of said cutter and in the hole of said support being of the same hand but of differing lead, a stud engaging both threaded holes and having axially spaced, externally threaded portions corresponding to the threads in said threaded holes the threads and the difference in lead being in the direction to firmly and positively wedge said tapered extension in said tapered hole as said torque is applied.

2. In a machining or cutting tool, a support having a conical hole and a threaded hole in line therewith, a circular cutter having a head and a conical extension in axial alignment and a cutting nose on the head to one side of the axis so that as the cutting nose engages a work piece there is a torque applied to the cutter about the axis, said conical extension being adapted to seat in said conical hole, said cutter having an axially aligned threaded hole, the threads in the hole of said cutter and in the hole of said support being of the same hand but of differing lead, a stud engaging both threaded holes and having axially spaced, externally threaded portions corresponding to the threads in said threaded holes the threads and the difference in lead being in the direction to firmly wedge said conical extension in said conical hole as said torque is applied, one of the mating surfaces of said conical hole and conical extension having one or more clearance channels to accommodate any slight metal flow when these parts are locked together.

3. In a machining or cutting tool for outside work and adapted to be used with a lathe or the like, a substantially horizontal shank having a conical hole whose axis is disposed in a vertical plane normal to the axis of the shank, said hole axis being inclined downwardly toward the larger end of the hole, a circular cutter having a tapered extension adapted to fit in said hole and having an enlarged head, said head having a conical surface in a direction away from the extension to provide a large end with a circular edge on the head remote from the extension, said head having a cut away segment leaving a stock segment, said stock segment providing a cutting nose or point at said circular edge, said shank having a first reference line parallel to its axis adapted to be disposed normal to the lathe axis for making a cylindrical, taper or profile turning cut, said shank having a second reference line oblique to said first reference line and adapted to be disposed normal to the lathe axis for making a plane, bevel or profile facing cut.

4. In a setup for turning tools and the like, a support having a hole whose axis is adapted to be disposed in plane substantially parallel to the axis of the work, the axis of said hole inclining with respect to the work axis, a circular cutter having an extension adapted to fit in said hole and having an enlarged cutting head having a cutting nose, a jig comprising a base adapted to seat on said support with one flat outer surface of said base substantially parallel to the axis of said hole, detachable connections between said base and said support whereby the jig may be removed, said jig comprising an arm lying on and extending parallel to said flat outer surface having a slot, an adjustable clamping screw passing through said slot and into said base, an adjustable positioning screw passing approximately perpendicularly through said arm with the end of said positioning screw adapted to engage the cutting nose or point to locate the cutting nose or point for the cutting operation.

5. In a machining or cutting tool for external work, a shank having a longitudinal axis adapted to extend substantially at right angles to the lathe axis, the side wall of said shank having a hole whose axis is disposed in plane substantially perpendicular to the axis of the shank, the axis of said hole being either horizontal or inclining downwardly with respect to the top reference surface of said shank, a circular cutter having an extension adapted to fit in said hole and an enlarged cutting head having a cutting nose, a jig comprising a base adapted to seat on said top reference surface with one flat outer surface of said base substantially parallel to the axis of said hole, detachable connections between said base and said shank whereby the jig may be removed, said jig comprising an arm lying on and extending parallel to said flat outer surface having a slot, an adjustable clamping screw passing through said slot and into said base, an adjustable positioning screw passing approximately perpendicularly through said arm, the parts being so arranged that the plane of the end of said positioning screw passes substantially through the cutting point, when the cutting point is in the approximate position in which it will be used for the cutting operation.

6. In a machining or cutting tool setup, a support having a first hole and a threaded hole in line therewith, a cutter having an axis, a cutting nose near one end to one side of the axis so that as the cutting nose engages a work piece there is a torque applied to the cutter about the cutter axis and at the other end an extension adapted to set in said first hole, said cutter having an axially aligned threaded hole, the threads in the hole of said cutter and in the hole of said support being of the same hand but of different lead, a stud engaging both holes having axially spaced, externally threaded portions corresponding to the threads in said threaded holes, the threads and the difference in lead being in the direction which tightens the cutter to the support as said torque is applied.

7. The combination according to claim 6 in which said first hole and said extension have tapered mating surfaces, one of the mating surfaces having at least one clearance channel to accommodate any slight metal flow when these parts are locked together.

References Cited in the file of this patent

UNITED STATES PATENTS

| Number | Name | Date |
|---|---|---|
| 280,146 | Douglas | June 26, 1883 |
| 442,907 | Moreland | Dec. 16, 1890 |
| 1,542,007 | Schroeder | June 16, 1925 |
| 1,632,528 | Zeidler | June 14, 1927 |
| 1,673,039 | Brown | June 12, 1928 |
| 2,096,472 | Schmidt | Oct. 19, 1937 |
| 2,346,084 | Sanocki | Apr. 4, 1944 |
| 2,504,249 | Bruce | Apr. 18, 1950 |
| 2,513,345 | Mealey | July 4, 1950 |

FOREIGN PATENTS

| Number | Country | Date |
|---|---|---|
| 5,854 | Great Britain | Mar. 11, 1909 |
| 256,153 | Great Britain | August 1926 |
| 751,451 | France | June 19, 1933 |
| 792,909 | France | Nov. 7, 1935 |